United States Patent
Shachar et al.

(10) Patent No.: US 12,250,219 B2
(45) Date of Patent: Mar. 11, 2025

(54) PREVENTING MALICIOUS PROCESSES BY VALIDATING THE COMMAND AUTHORITY OF COMMANDS BETWEEN NETWORK EQUIPMENT

(71) Applicant: Dell Products L.P., Round Rock, TX (US)

(72) Inventors: Tomer Shachar, Omer (IL); Yevgeni Gehtman, Modi'in (IL); Maxim Balin, Gan-Yavne (IL); Arieh Don, Newton, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 318 days.

(21) Appl. No.: 17/581,323

(22) Filed: Jan. 21, 2022

(65) Prior Publication Data
US 2023/0239296 A1 Jul. 27, 2023

(51) Int. Cl.
*H04L 9/40* (2022.01)
(52) U.S. Cl.
CPC ........ *H04L 63/0892* (2013.01); *H04L 63/083* (2013.01)
(58) Field of Classification Search
CPC ................... H04L 63/0892; H04L 63/083
See application file for complete search history.

(56) References Cited

U.S. PATENT DOCUMENTS

| | | | | |
|---|---|---|---|---|
| 2014/0115182 A1* | 4/2014 | Sabaa | ................ | H04L 67/1097 709/232 |
| 2018/0123975 A1* | 5/2018 | Ayandeh | ............... | H04L 49/111 |
| 2021/0075795 A1* | 3/2021 | Liu | ........................ | H04L 63/083 |
| 2021/0258318 A1* | 8/2021 | Greene | .................. | G06F 21/31 |
| 2021/0326452 A1* | 10/2021 | Diehl | .................... | H04L 63/105 |

FOREIGN PATENT DOCUMENTS

EP          1862893 A2 * 12/2007  ............ G06F 3/0611

* cited by examiner

*Primary Examiner* — Luu T Pham
*Assistant Examiner* — Paul J Skwierawski
(74) *Attorney, Agent, or Firm* — Amin, Turocy & Watson, LLP

(57) ABSTRACT

The technologies described herein are generally directed toward monitoring file sharing commands between network equipment to identify adverse conditions. According to an embodiment, a system can comprise a processor and a memory that can enable performance of operations including identifying a resource allocation communication between first network equipment and second network equipment via a network, with the resource allocation communication including a command authority and an allocation command. In an additional operation, based on the resource allocation communication, a validation source can be selected to validate the command authority for execution of the allocation command by the second network equipment. Further operations include, based on a failure to validate by the validation source, blocking execution of the allocation command by the second network equipment.

20 Claims, 10 Drawing Sheets

PREVENTING MALICIOUS PROCESSES BY VALIDATING THE COMMAND AUTHORITY OF COMMANDS BETWEEN NETWORK EQUIPMENT

BACKGROUND

Modern data storage computer systems can facilitate the storage and manipulation of data by a variety of different network equipment. Problems can occur when malware is secretly controlling the operation of otherwise authorized data manipulation equipment. In some circumstances, malware can control a data manipulating client process to execute a combination of file sharing commands that can cause problems for data on data storage equipment.

These problems can be further enhanced when data is stored and accessed within a cloud-based environment, e.g., because the physical hardware of the data storage system cannot be easily accessed and disabled.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to identify a resource allocation communication between first network equipment and second network equipment via a network, wherein the resource allocation communication comprises a command authority and an allocation command. The system can include an additional instruction to, based on the resource allocation communication, select a validation source to validate the command authority for execution of the allocation command by the second network equipment. Additional instructions can include an instruction to, based on a failure to validate by the validation source, block execution of the allocation command by the second network equipment.

An example method can comprise identifying a resource allocation communication between first network equipment and second network equipment via a network, wherein the resource allocation communication comprises a command authority and an allocation command. The method can further include, based on the resource allocation communication, selecting a validation source to validate the command authority for execution of the allocation command by the second network equipment. Further, the method can include, based on a failure to validate by the validation source, blocking execution of the allocation command by the second network equipment.

An example non-transitory computer-readable medium can comprise instructions that, in response to execution, cause a system comprising a processor to perform operations. These operations can comprise identifying a resource allocation communication between first network equipment and second network equipment via a network, wherein the resource allocation communication comprises a command authority and an allocation command. The operations can further include, based on the resource sharing communication based on the resource allocation communication, selecting a validation source to validate the command authority for execution of the allocation command by the second network equipment. Further, the operations can include, based on a failure to validate by the validation source, blocking execution of the allocation command by the second network equipment.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate preventing malicious processes by monitoring resource allocation commands between network equipment to validate command authority. One or more embodiments can use different approaches to, without adversely affecting system performance, detect adverse conditions that can occur when networked equipment uses resource sharing communications (e.g., commands) to alter data on data storage equipment. Monitoring and validating commands generated for data manipulation can, in one or more embodiments, result in the detection of malware before damage to a data store occurs.

One having skill in the relevant art(s), given the description herein, appreciates that different types of malware and other adverse conditions can be handled by embodiments in some circumstances, including, but not limited to, ransomware, file tampering, denial of service attacks, and data leakage. For example, in one or more embodiments, a malicious combination of commands can be issued by the first network equipment that improperly restricts access to resources stored by the second network equipment, e.g., a denial of service attack. In additional or alternative embodiments, the unauthorized restriction of access to the resources stored by the second network equipment can be a ransomware attack targeting the resources stored via the second network equipment, e.g., a cryptographic malware attack by the first network equipment on the second network equipment. Additional illustrative examples are provided below.

Embodiments of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
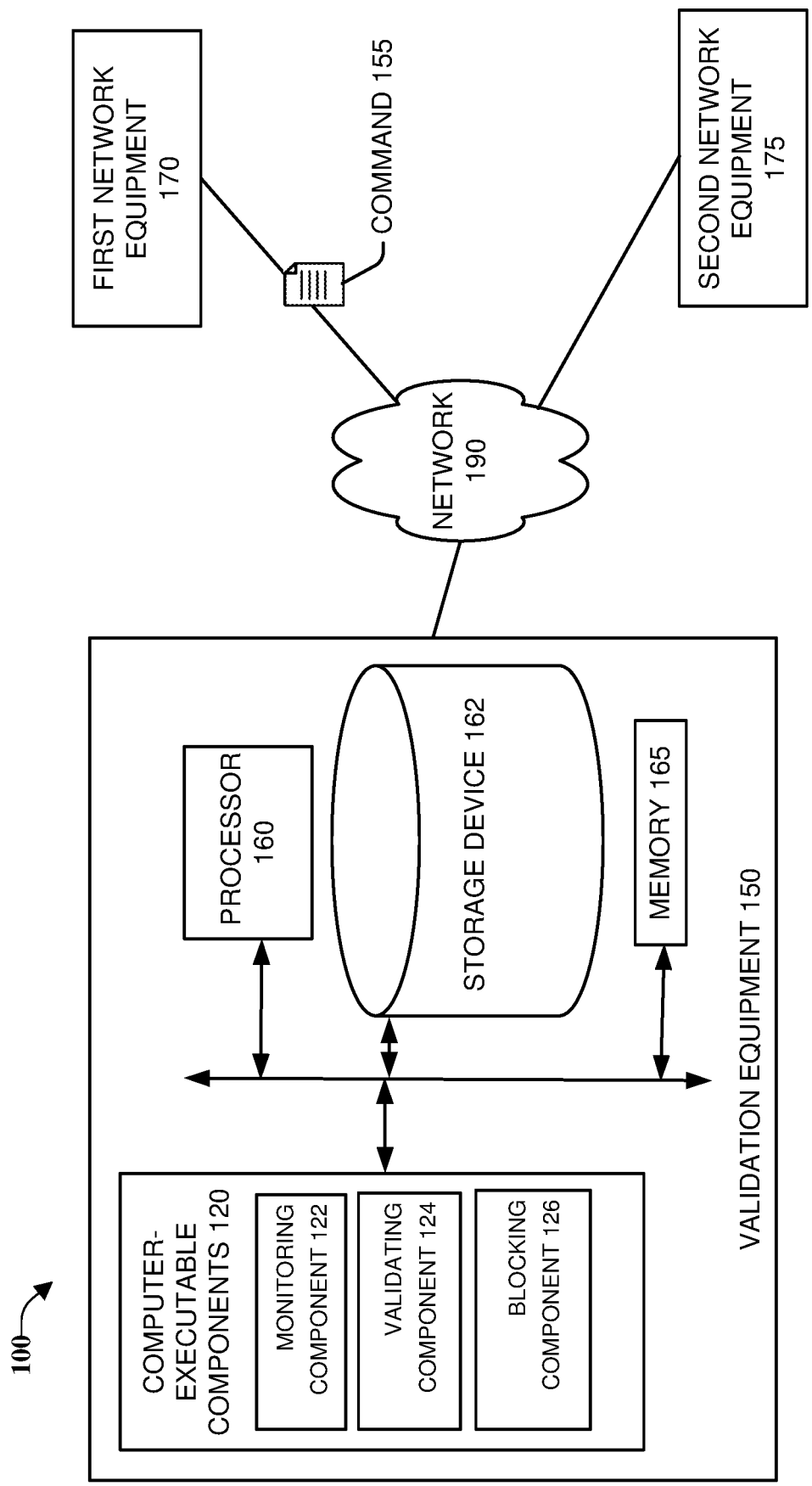
FIG. 1 is an architecture diagram of an example system that can facilitate preventing malicious processes by monitoring resource allocation commands between network equipment to validate command authority, in accordance with one or more embodiments.

FIG. 1 is an architecture diagram of an example system 100 that can facilitate preventing malicious processes by monitoring resource allocation commands between network equipment to validate command authority, in accordance with one or more embodiments. For purposes of brevity, description of like elements and/or processes employed in other embodiments is omitted. As depicted, system 100 includes validation equipment 150 connected to first network equipment 170 and second network equipment 175 via network 190. According to multiple embodiments, validation equipment 150 can include memory 165 that can store one or more computer and/or machine readable, writable, and/or executable components 120 and/or instructions. First network equipment is depicted issuing command 155 for second network equipment 175 via network 190.

In embodiments, validation equipment 150 can further include processor 160 and storage device 162. In one or more embodiments, computer-executable components 120, when executed by processor 160, can facilitate performance of operations defined by the executable component(s) and/or instruction(s). Computer executable components 120 can include monitoring component 122, validating component 124, blocking component 126, and other components described or suggested by different embodiments described herein, that can improve the operation of system 100.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

It is understood that the computer processing systems, computer-implemented methods, apparatus, and computer program products described herein employ computer hardware and/or software to solve problems that are highly technical in nature (e.g., monitoring and validating complex data manipulation commands between network equipment), that are not abstract and cannot be performed as a set of mental acts by a human. For example, a human, or even a plurality of humans, cannot efficiently defend against malicious combination of data manipulation instructions with a level of accuracy and/or efficiency as the various embodiments described herein.

In one or more embodiments, memory 165 can store computer and/or machine readable, writable, and/or executable components 120 and/or instructions that, when executed by processor 160, can facilitate execution of the various functions described herein relating to monitoring component 122, validating component 124, blocking component 126, as well as other components to implement and provide functions to system 100, and some other embodiments described herein.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of monitoring component 122, which can, in some implementations, identify a resource allocation communication between first network equipment and second network equipment via a network, with the resource allocation communication comprising a command authority and an allocation command. As discussed with FIGS. 3-5 below, one or more embodiments can identify a resource allocation communication (e.g., command 155) between first network equipment 170 and second network equipment 175 via a network 190, with the resource allocation communication (e.g., command 155) comprising a command authority and an allocation command.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of validating component 124, which can in some implementations, can, based on the resource allocation communication, select a validation source to validate the command authority for execution of the allocation command by the second network equipment. As discussed with FIGS. 3-5 below, one or more embodiments can, based on the resource allocation communication (e.g., command 155), select a validation source (e.g., stored in storage device 162) to validate the command authority for execution of the allocation command (e.g., command 155) by second network equipment 175.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of blocking component 126, which can in some implementations, can, based on a failure to validate by the validation source, block execution of the allocation command by the second network equipment. As discussed with FIGS. 3-5 below, one or more embodiments can, based on a failure to validate by the validation source, block execution of the allocation command by the second network equipment 175.

It is appreciated that the embodiments of the subject disclosure depicted in various figures disclosed herein are for illustration only, and as such, the architecture of such embodiments are not limited to the systems, devices, and/or components depicted therein. For example, in some embodiments, validation equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

It should be noted that validation equipment 150 can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as validation equipment 150.

Figure 2:
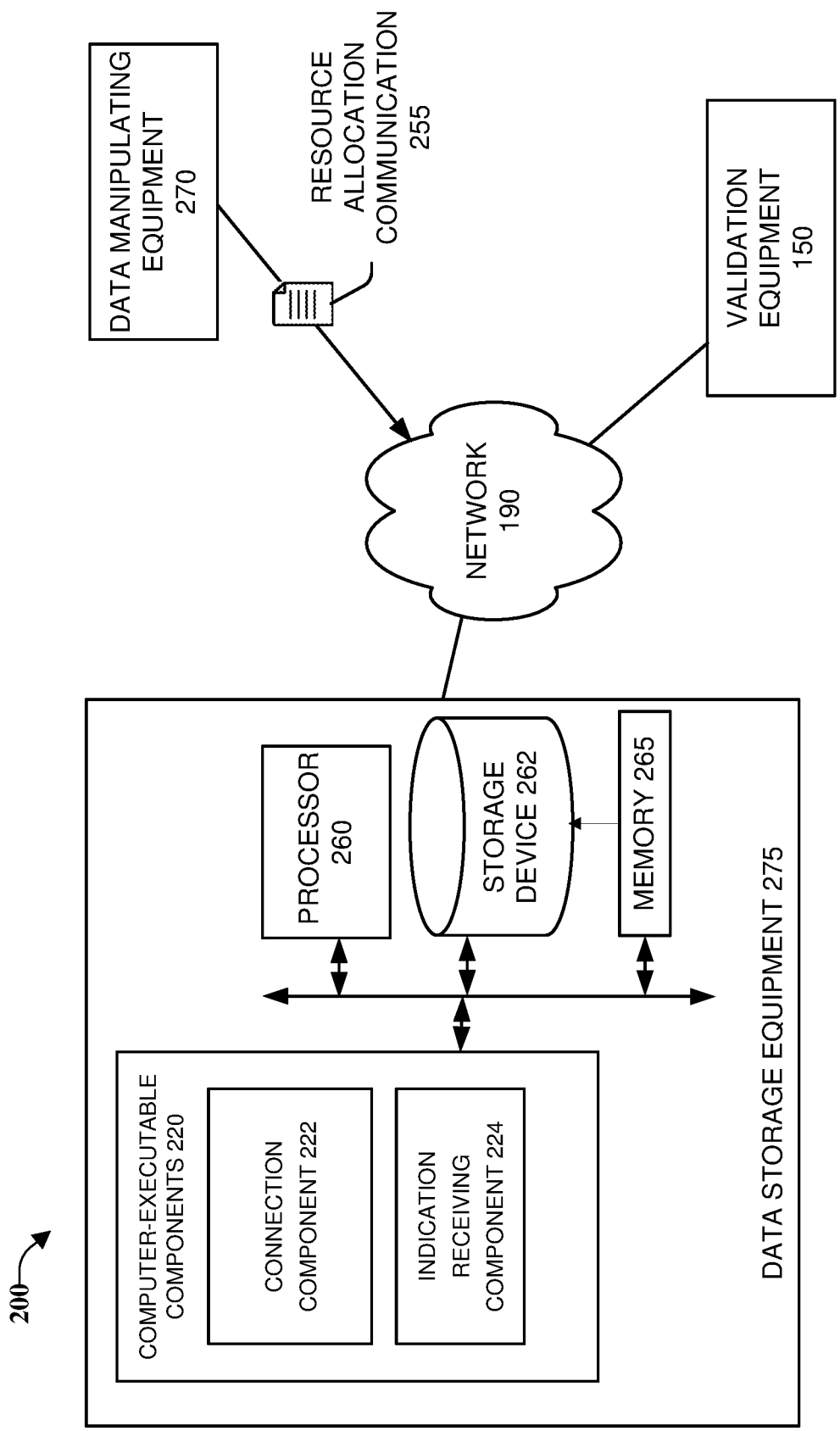
FIG. 2 is an architecture diagram of an example system that can facilitate preventing malicious processes by monitoring resource allocation commands between network equipment to validate command authority, in accordance with one or more embodiments.

FIG. 2 is an architecture diagram of an example system 200 that can facilitate preventing malicious processes by monitoring resource allocation commands between network equipment to validate command authority, in accordance with one or more embodiments. For purposes of brevity, description of like elements and/or processes employed in other embodiments is omitted. As depicted, system 200 includes data storage equipment 275 connected to data manipulating equipment, and validation equipment 150 via network 190. Data manipulating equipment 270 is depicted as issuing resource allocation communication 255 to data storage equipment 275 via network 190. Example types of data storage equipment 275 can include, but are not limited to, financial services equipment, healthcare and pharmaceutical equipment, intelligent connected vehicle (ICV) equipment, and telecommunications systems equipment.

In embodiments, data storage equipment 275 can include processor 260 (e.g., similar to processor 160) and storage device 262, e.g., similar to storage device 162. According to multiple embodiments, data storage equipment 275 can further include memory 265 (similar to memory 165) that can store one or more computer and/or machine readable, writable, and/or executable components 220 and/or instructions that, when executed by processor 260, can facilitate performance of operations defined by the executable component(s) and/or instruction(s). According to multiple embodiments, memory 265 can store one or more computer and/or machine readable, writable, and/or executable components 220 and/or instructions, which can, when executed by processor 260, facilitate performance of operations defined by the executable component including connection component 222, indication receiving component 224, and other components described or suggested by different embodiments described herein, that can improve the operation of system 200.

In one or more embodiments, computer executable components 220 can be used in connection with implementing one or more of the systems, devices, components, and/or computer-implemented operations shown and described in connection with FIG. 2 or other figures disclosed herein. In an example implementation of data storage equipment 275, memory 265 can store executable instructions that can facilitate generation of connection component 222, which in some implementations, can establish a connection to network equipment via a network. As discussed with FIGS. 3-5 below, one or more embodiments can establish a connection to network equipment via a network, e.g., embodiments of data manipulation equipment 270 to data storage equipment 275 via network 190.

Continuing this example implementation example, memory 265 can store executable instructions that can facilitate generation of indication receiving component 224, which in some implementations, can receive an indication that execution of a command, communicated via the connection, to modify stored data was prevented by validation equipment, wherein a process of the network equipment, which issued the command, failed a validation check by the validation equipment. For example, as discussed in further detail with FIG. 5 below, in one or more embodiments, indication receiving component 224 can receive an indication (e.g., from validation equipment 150) that execution of a command, communicated via the connection (e.g., resource allocation communication 255), to modify stored data (e.g., in storage device 262 in data storage equipment 275) was prevented by validation equipment 150, wherein a process of the network equipment (e.g., data manipulation equipment), which issued the command, failed a validation check by validation equipment 150.

Figure 3:
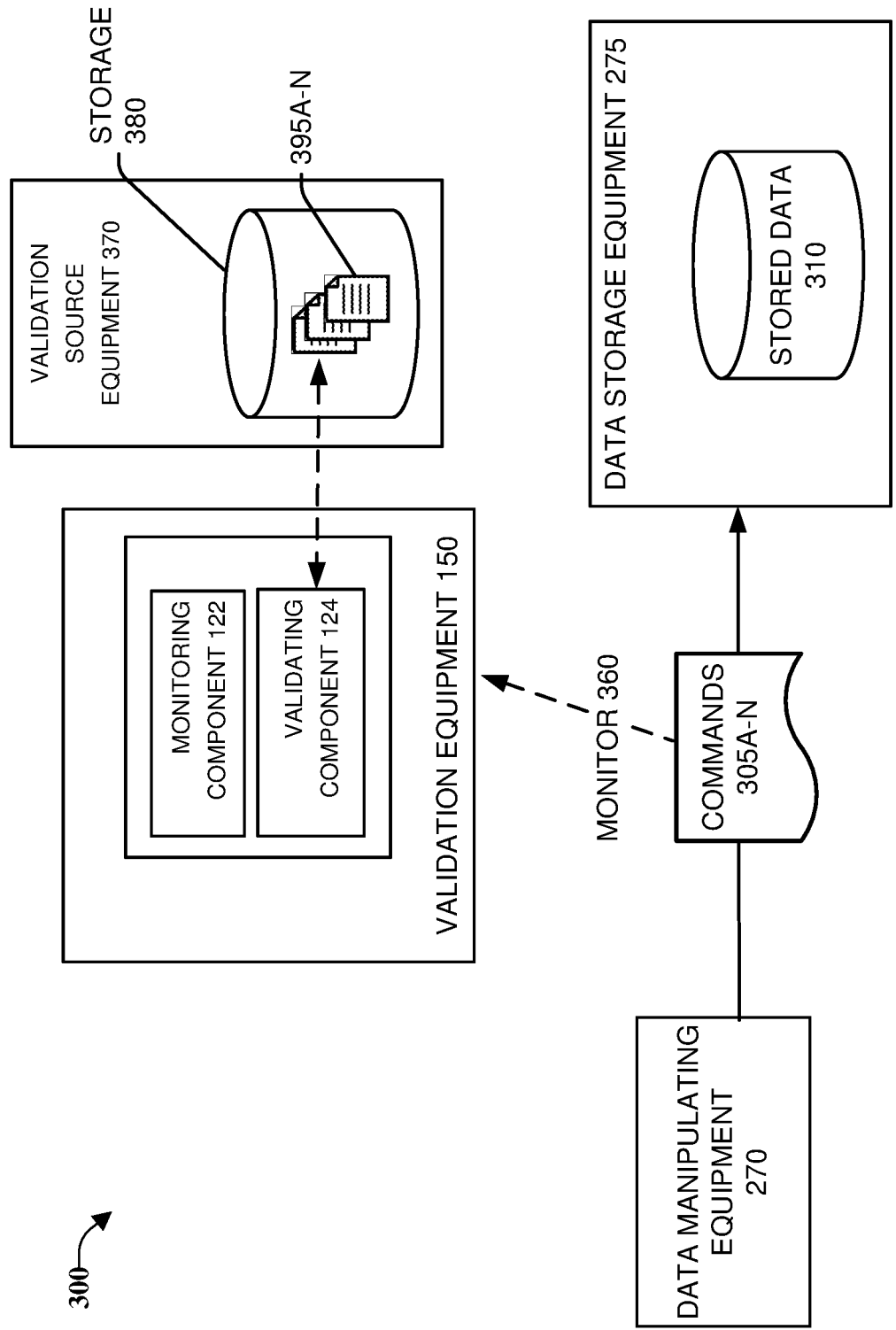
FIG. 3 is an architecture diagram of an example system that can facilitate preventing malicious processes by monitoring resource allocation commands between network equipment to validate command authority, in accordance with one or more embodiments.

FIG. 3 is an architecture diagram of an example system 300 that can facilitate preventing malicious processes by monitoring resource allocation commands between network equipment to validate command authority, in accordance with one or more embodiments. For purposes of brevity, description of like elements and/or processes employed in other embodiments is omitted. As depicted, system 300 includes validation equipment 150 monitoring 360 commands 305A-N issued by data manipulating equipment 270 to manipulate stored data 310 stored with data storage equipment 275. To illustrate different elements of system 300, monitoring component 122 and validating component 124, described with FIG. 1 above, are discussed in additional detail with FIG. 3. In addition, validation source equipment 370 is connected to validation equipment 150, with storage 380 including validation entries 395A-N for processes of data manipulating equipment 270.

As noted above, one or more embodiments can monitor and analyze communications between data manipulating equipment 270 and data storage equipment 275 to identify commands issued by data manipulating equipment 270 that are not authorized. In one or more embodiments, the validation check provided by validation equipment 150 compares credentials of the process (e.g., command 305A) with a source of valid credentials for issuing the command, e.g., validation entries 395A stored at validation source equipment 370.

Figure 4:
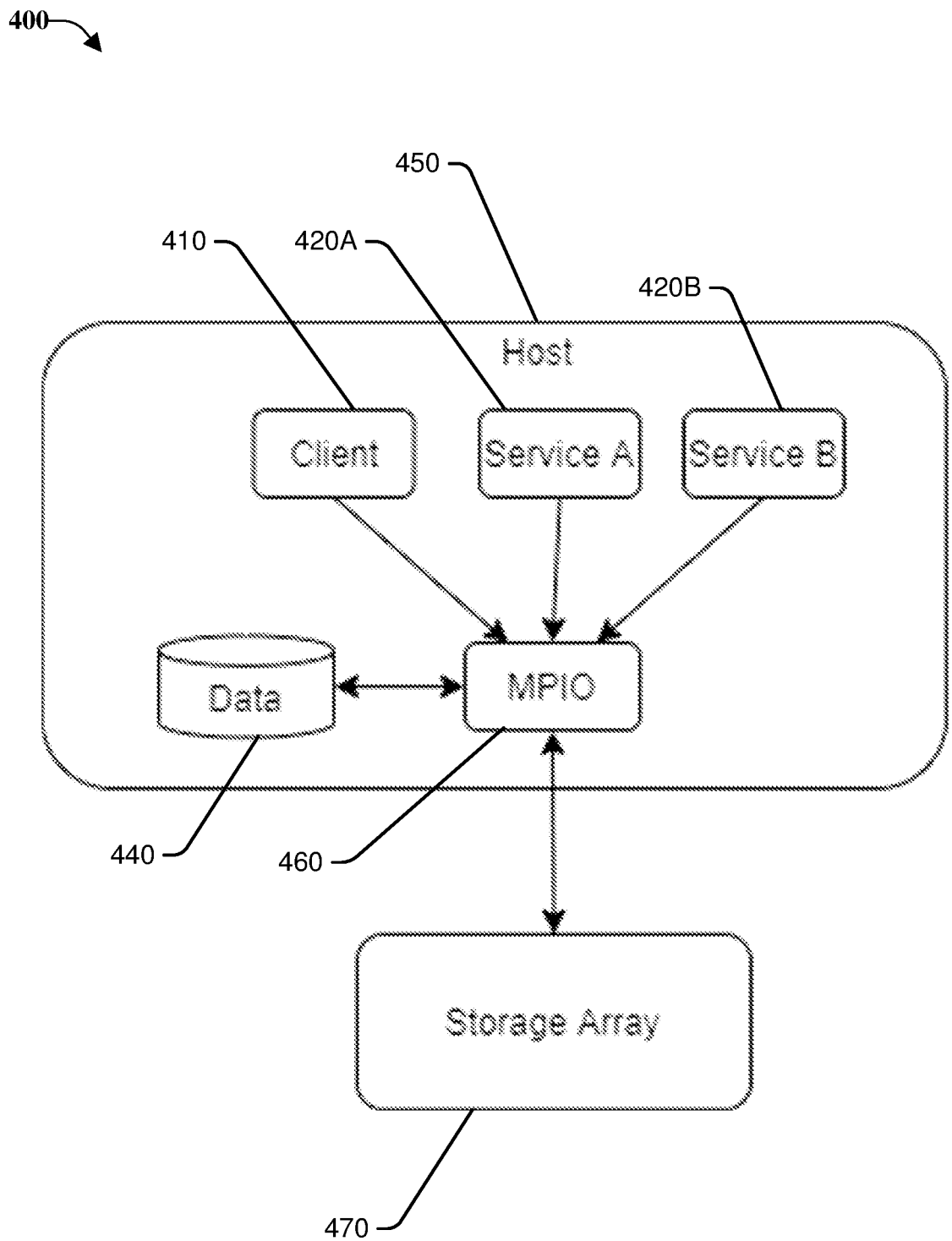
FIG. 4 is an architecture diagram of an example system that can utilize a multipath communication protocol to facilitate preventing malicious processes by monitoring resource allocation commands between network equipment to validate command authority, in accordance with one or more embodiments.

FIG. 4 is an architecture diagram of an example system 400 that can utilize a multipath communication protocol to facilitate preventing malicious processes by monitoring resource allocation commands between network equipment to validate command authority, in accordance with one or more embodiments. As depicted, system 400 includes host 450 communicatively coupled to storage array 470. Host 450 includes client 410, services 420A-B, and data 440 linked via multipath input/output protocol interface (MPIO) 460, which couples host 450 to storage array 470. In some implementations, MPIO 460 can facilitate consistent application availability and performance across I/O paths on combinations of physical and virtual platforms.

In one or more embodiments, client 410 and services 420A-B are sources of resource allocation commands for storage array 470. In an example implementation, one or more embodiments of MPIO 460 can identify resource allocation communication between one or more of client 410 and services 420A-B. Once identified, MPIO 460 can select a command authority for execution of the identified commands.

An example of command authority verification performed by one or more embodiments includes identifying the process/thread/parent process of the identified commands and querying validation source equipment to determine whether the identified commands are approved for execution by storage array 470. Once validation is completed the identified commands can be passed to storage array 470 for execution. An advantage of using MPIO 460 for this relay of commands includes that the approach can be handled by a variety of protocol standards, including, but not limited to, Non Volatile Memory Express (NVMe) over fabric (NVMeF) and using transmission control protocol (NVMeTCP), as well as Small Computer System Interface over fiber channel (SCSI-FC).

In one or more embodiments, based on a failure to validate the identified commands, MPIO 460 can block the execution of the commands, e.g., by not forwarding the unvalidated commands to storage array 470 from host 450. For example, one or more embodiments can, when host 450 is infected with a ransomware process, this malware can be prevented executing data manipulation commands on data stored at storage array 470, e.g., a ransomware encryption process will be prevented from accessing storage array 470. In one or more embodiments, to validate commands, host 450 can access process credentials stored at data 440. Process credentials accessed can include, but are not limited to, process/thread name, and permitted commands.

In an example of MPIO 460 receiving an updated source of approved processes, in advance of commands being issued by host 450, host 450 can receive a dedicated logical unit number (LUN) from storage array 470 for the approved process list. With the LUN, host 450 can securely receive an updated approval list from storage array 470 and, upon completion of the transfer, storage array 470 can set the provided LUN to read only (RO). In this example approach, the change in LUN permissions can protect the approval list from being modified, e.g., as it is stored and accessed from data 440 in host 450.

Figure 5:
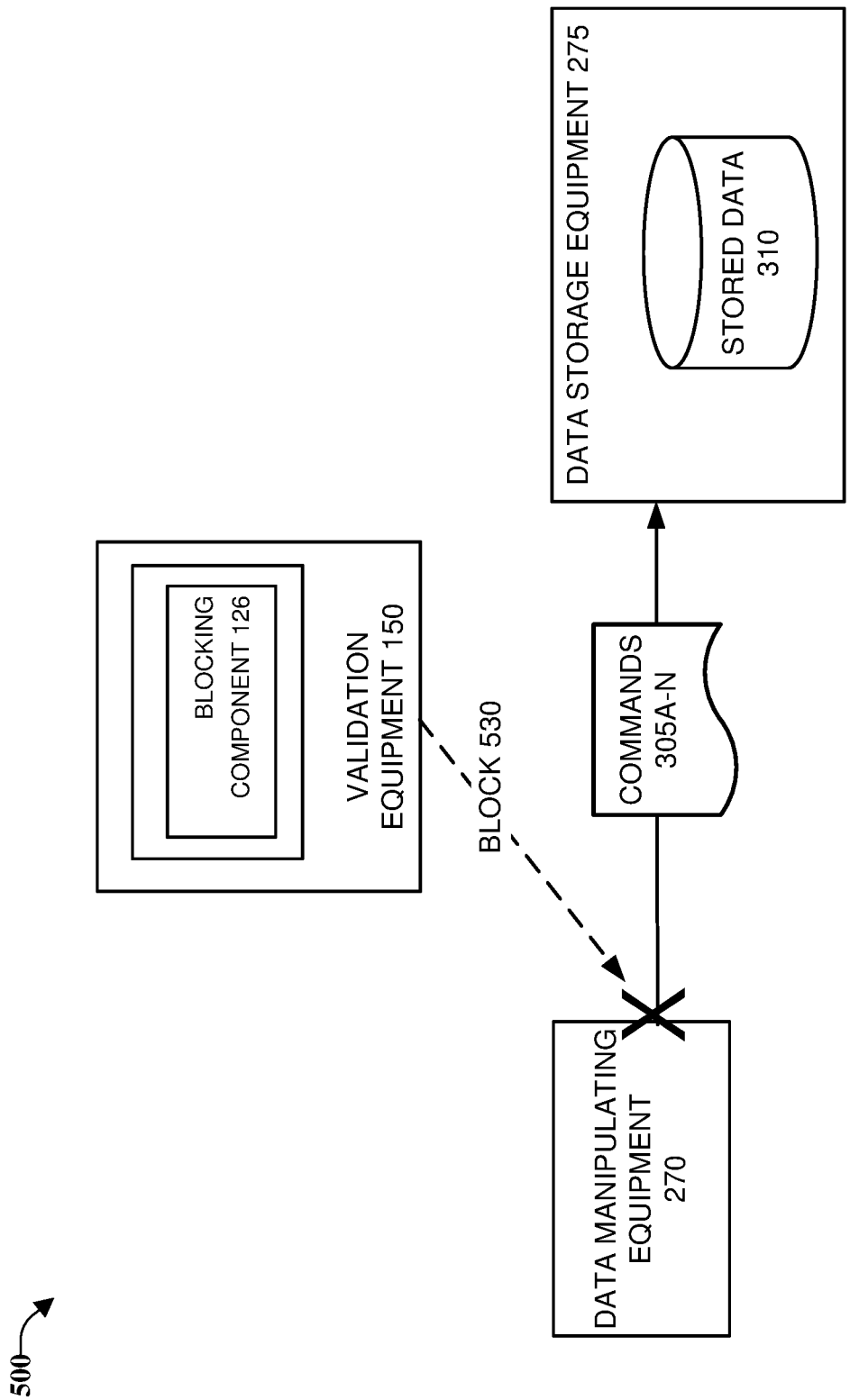
FIG. 5 depicts an architectural diagram that can facilitate blocking malicious processes from being performed by data storage equipment, in accordance with one or more embodiments.

FIG. 5 depicts an architectural diagram 500 that can facilitate blocking malicious processes from being performed by data storage equipment, in accordance with one or more embodiments. For purposes of brevity, description of like elements and/or processes employed in other embodiments is omitted. As depicted, system 500 includes validation equipment 150 with blocking component 126 for blocking 530 execution of commands 305A-N issued by data manipulating equipment 270.

In one or more embodiments, different actions can be performed in response to a determination that ones of commands 305A-N are not authorized for execution by storage equipment 275. In the example depicted, validation equipment 150 can use blocking component 126 to block the issuance of commands by data manipulating equipment 270. One having skill in the relevant art(s), given the description herein, appreciates that other approaches can be used to respond to potential adverse events detected, e.g., including but not limited to, blocking commands being received and processed by data storage equipment 275, and redirecting commands to an alternative destination for analysis.

Figure 6:
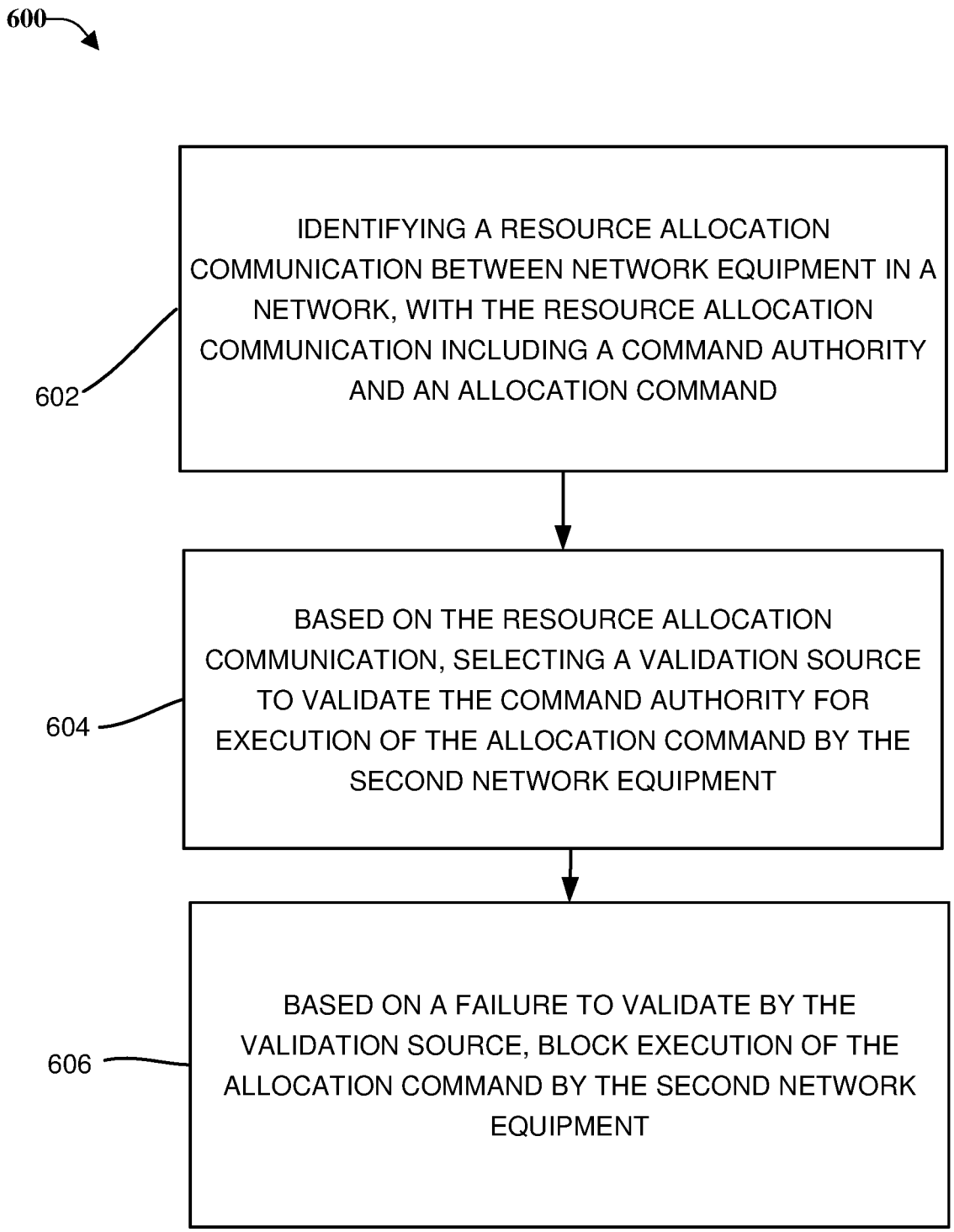
FIG. 6 depicts a flow diagram representing example operations of an example method that can facilitate preventing malicious processes by validating command authority for resource allocation commands between network equipment to validate command authority, in accordance with one or more embodiments.

FIG. 6 depicts a flow diagram representing example operations of an example method 600 that can facilitate preventing malicious processes by monitoring resource allocation commands between network equipment to validate command authority, in accordance with one or more embodiments. For purposes of brevity, description of like elements and/or processes employed in other embodiments is omitted.

In some examples, one or more embodiments of method 600 can be implemented by monitoring component 122, validating component 124, blocking component 126, and other components that can be used to implement parts of method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

At 602 of method 600, monitoring component 122 can, in one or more embodiments, identify a resource allocation communication between first network equipment and second network equipment via a network, wherein the resource allocation communication comprises a command authority and an allocation command. At 604 of method 600, validating component 124 can, in one or more embodiments, based on the resource sharing communication based on the resource allocation communication, select a validation source to validate the command authority for execution of the allocation command by the second network equipment.

At 606 of method 600, blocking component 126 can, in one or more embodiments, based on a failure to validate by the validation source, block execution of the allocation command by the second network equipment.

Figure 7:
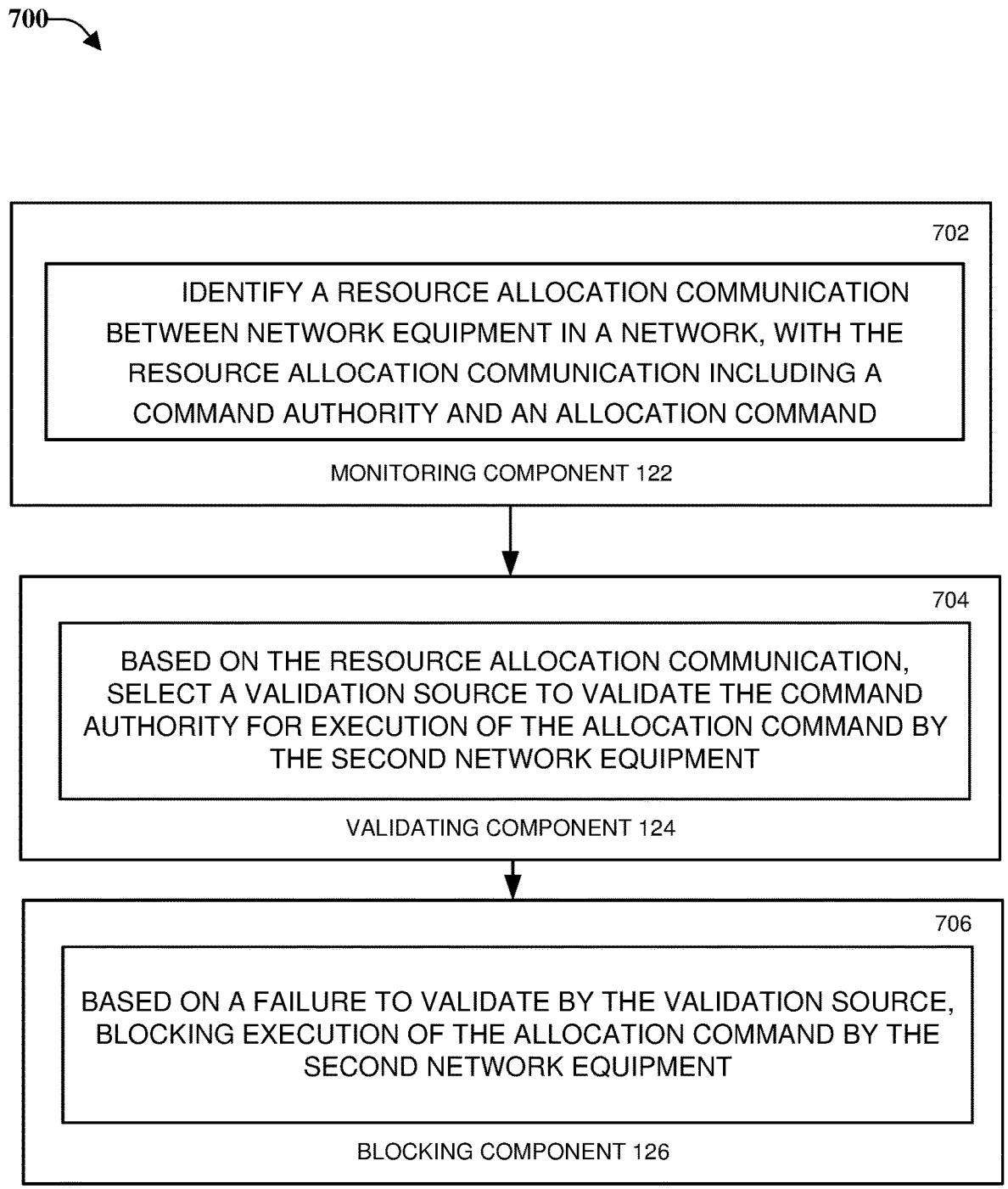
FIG. 7 depicts an example system that can facilitate preventing malicious processes by monitoring resource allocation commands between network equipment to validate command authority, in accordance with one or more embodiments.

FIG. 7 depicts an example system 700 that can facilitate preventing malicious processes by monitoring resource allocation commands between network equipment to validate command authority, in accordance with one or more embodiments. For purposes of brevity, description of like elements and/or processes employed in other embodiments is omitted. Example system 700 can include monitoring component 122, validating component 124, blocking component 126, and other components that can be used to implement parts of system 700, as described herein, in accordance with one or more embodiments.

At 702 of FIG. 7, monitoring component 122 can identify a resource allocation communication between first network equipment and second network equipment via a network, wherein the resource allocation communication comprises a command authority and an allocation command. At 704 of FIG. 7, validating component 124 can, based on the resource allocation communication, select a validation source to validate the command authority for execution of the allocation command by the second network equipment. At 706 of FIG. 7, blocking component 126 can, based on a failure to validate by the validation source, block execution of the allocation command by the second network equipment.

Figure 8:
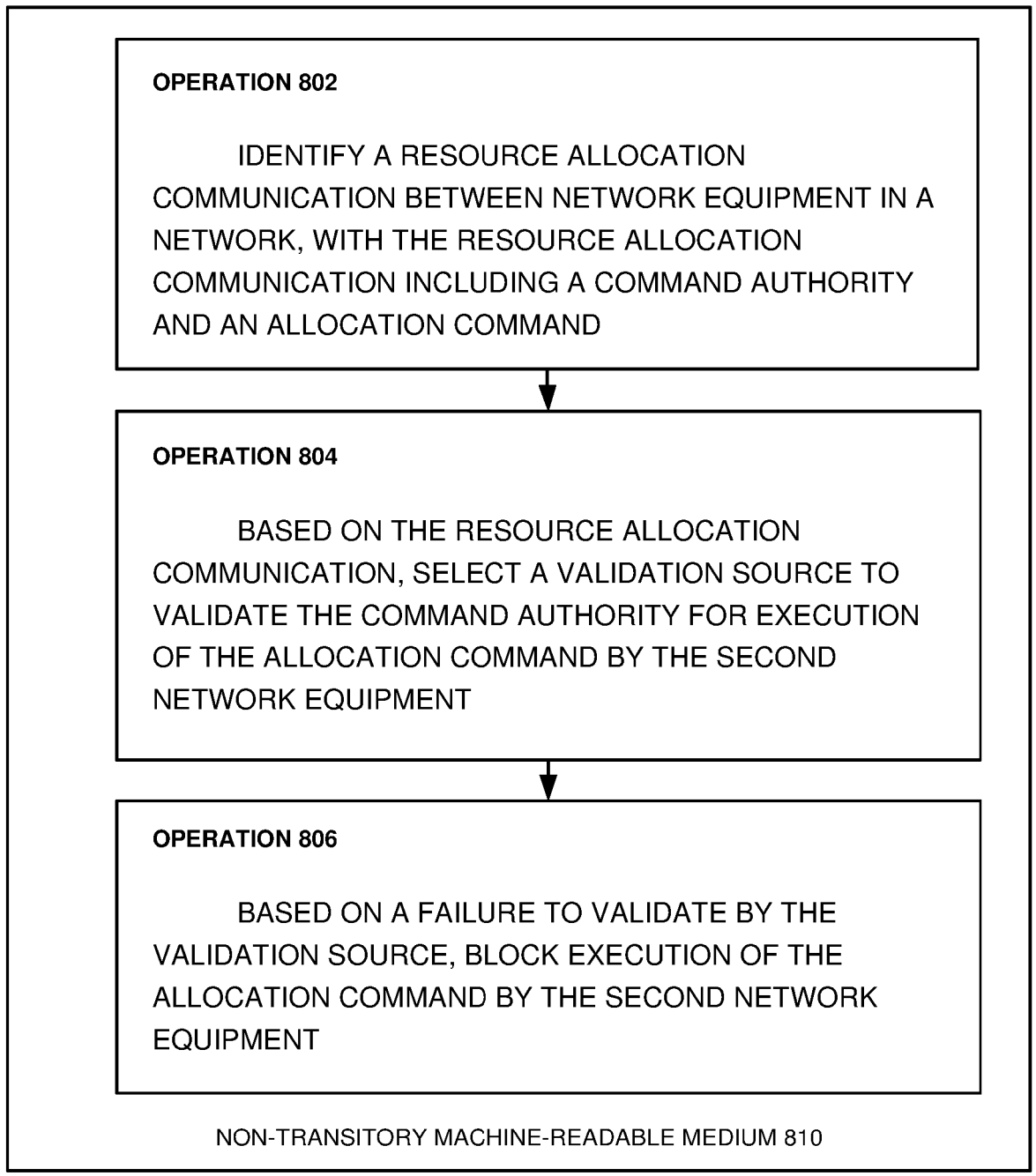
FIG. 8 depicts an example non-transitory machine-readable medium that can include executable instructions that, when executed by a processor of a system, facilitate preventing malicious processes by validating resource allocation commands between network equipment to validate command authority.

FIG. 8 depicts an example non-transitory machine-readable medium 800 that can include executable instructions that, when executed by a processor of a system, facilitate preventing malicious processes by monitoring resource allocation commands between network equipment to validate command authority. For purposes of brevity, description of like elements and/or processes employed in other embodiments is omitted.

Operation 802 of FIG. 8 can facilitate generation of monitoring component 122, which, in one or more embodiments, can identify a resource allocation communication between first network equipment and second network equipment via a network, wherein the resource allocation communication comprises a command authority and an allocation command. Operation 804 of FIG. 8 can facilitate generation of validating component 124 which, in one or more embodiments, can, based on the resource allocation communication, select a validation source to validate the command authority for execution of the allocation command by the second network equipment. Operation 806 of FIG. 8 can facilitate generation of blocking component 126 which, in one or more embodiments, can, based on a failure to validate by the validation source, block execution of the allocation command by the second network equipment.

Figure 9:
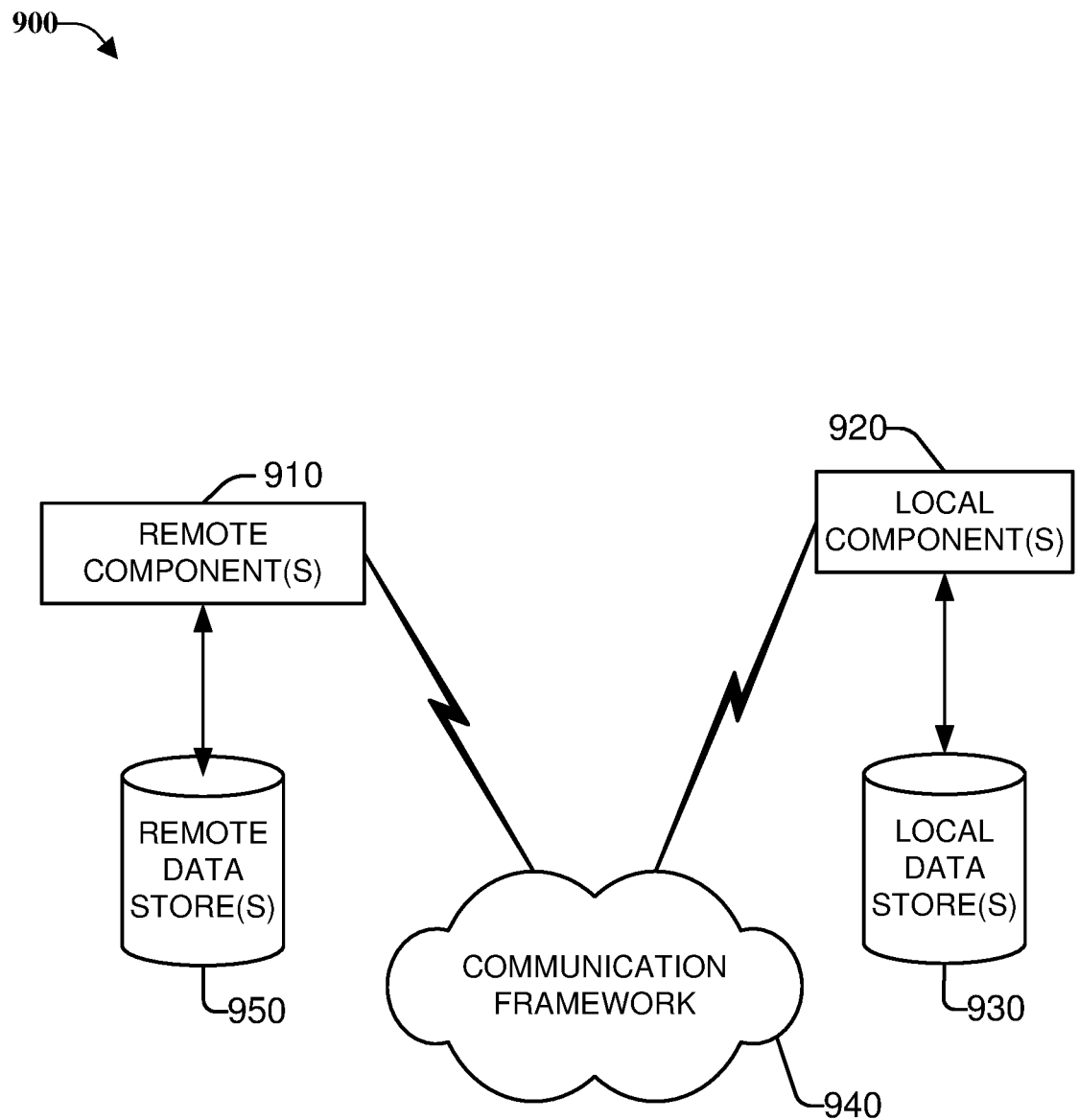
FIG. 9 depicts an example schematic block diagram of a computing environment with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various embodiments of the disclosed subject matter, the following discussion is intended to provide a brief, general description of a suitable environment in which the various embodiments of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated embodiments can also be practiced in distributed computing environments where tasks are performed by remote processing devices that are linked through a communications network; however, some if not all embodiments of the subject disclosure can be practiced on stand-alone computers. In a distributed computing environment, program modules can be located in both local and remote memory storage devices.

Figure 10:
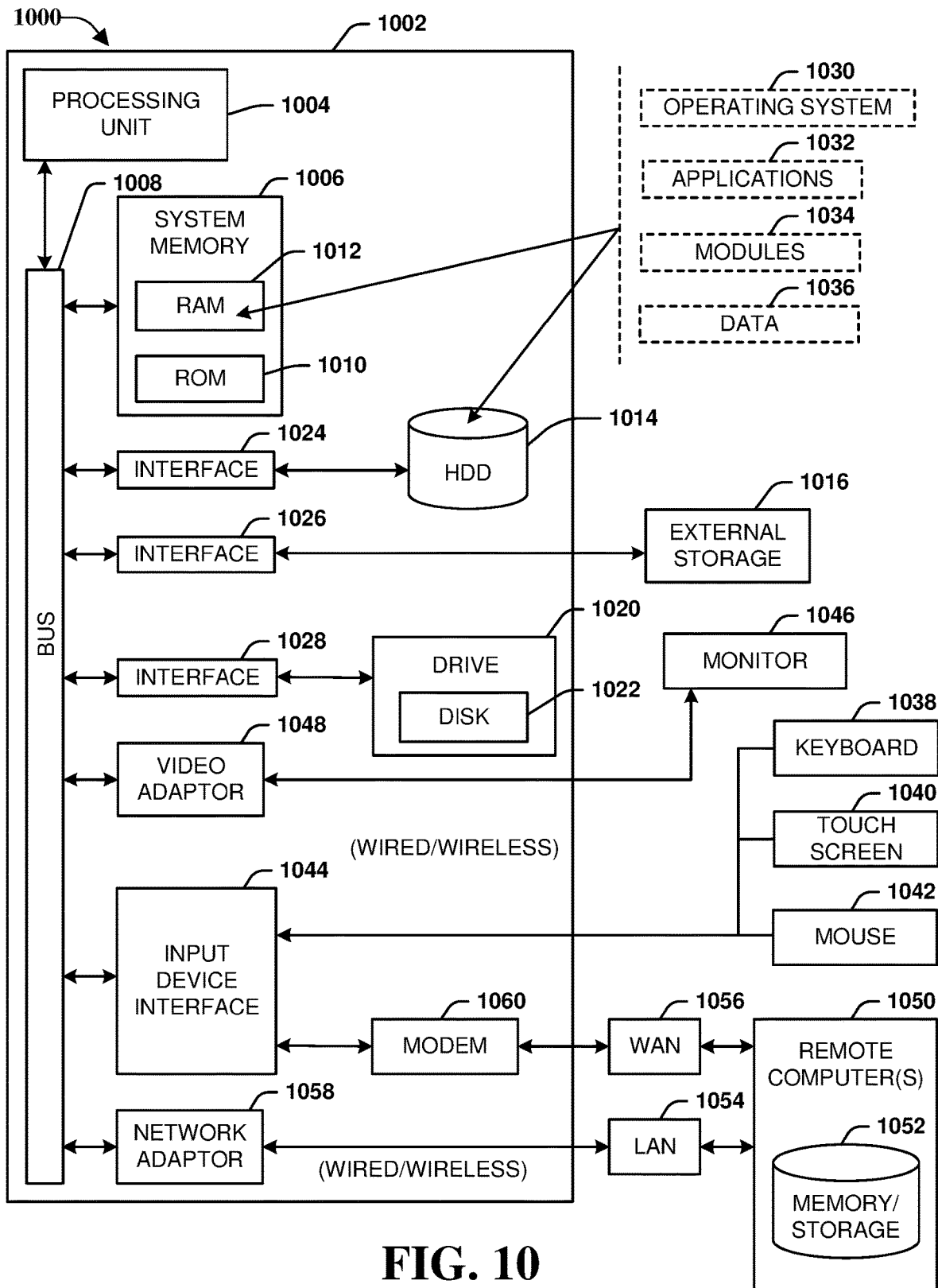
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), SynchLink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   identifying, by validation equipment comprising a processor, a resource allocation communication between first network equipment and second network equipment via a network, wherein the resource allocation communication comprises a command authority and an allocation command, wherein the network establishes intercommunication between the first network equipment and the second network equipment via a multipath input output protocol interface, and wherein the multipath input output protocol interface establishes the intercommunication using a group of protocol standards comprising at least one of a non volatile memory express over fabric protocol, a non volatile memory express over transmission control protocol, or a small computer system interface over fiber channel protocol;

based on the resource allocation communication, selecting, by the validation equipment, a validation source to validate the command authority for execution of the allocation command by the second network equipment;
based on a failure to validate by the validation source, blocking, by the validation equipment, execution of the allocation command by the second network equipment, wherein blocking the execution of the allocation command comprises preventing delivery of the allocation command to the second network equipment;
in response to the blocking, receiving, via the multipath input output protocol interface, an updated source of approved allocation command processes, and communicating to the first network equipment via the multiple input output protocol interface, a logical unit number associated with storage array equipment to which the updated source of approved allocation command processes has been persisted; and
in response to determining, based on the logical unit number, that the first network equipment has transferred the updated source of approved allocation command processes, setting, via the multipath input output protocol interface, a permission associated with the logical unit number to a read only permission.

2. The method of claim 1, wherein blocking the execution of the allocation command further comprises instructing the second network equipment to ignore the allocation command.

3. The method of claim 1, wherein the second network equipment comprises storage array equipment.

4. The method of claim 1, wherein the validation source selected comprises a source of valid command authorities for the allocation command.

5. The method of claim 1, wherein the allocation command comprises a removal command.

6. The method of claim 1, wherein the allocation command comprises a write command.

7. The method of claim 1, wherein the resource allocation communication employs a multipath input output protocol for communication.

8. The method of claim 1, wherein the command authority comprises a process executed by the first network equipment.

9. The method of claim 8, wherein the process comprises a malicious process that uses cryptography to improperly restrict access to stored data.

10. The method of claim 1, wherein the command authority comprises a thread executed by a processing component of the first network equipment.

11. Data storage equipment, comprising:
a processor; and
a memory that stores executable instructions that, when executed by the processor, facilitate performance of operations, comprising:
establishing a connection to network equipment via a network, wherein the network establishes the connection between the network equipment through a multipath input output protocol interface, and wherein the multipath input output protocol interface uses at least one of a group of protocol standards comprising a non volatile memory express over fabric protocol, a non volatile memory express over transmission control protocol, and a small computer system interface over fiber channel protocol;
receiving an indication that execution of a command, communicated via the connection, to modify stored data was blocked, wherein the execution of the command was blocked by having prevented communication of the command to the data storage equipment by validation equipment, wherein a process of the network equipment, which issued the command, failed a validation check by the validation equipment;
based on a failure of the validation check being determined to have occurred, receiving, via the multipath input output protocol interface, an updated source of approved command processes, and communicating, to the network equipment via the multipath input output protocol interface, a logical unit number associated with storage array equipment to which the updated source of approved command processes has been persisted; and
in response to determining, based on the logical unit number, that the network equipment has retrieved the updated source of approved command processes, setting, via the multipath input output protocol interface, a permission associated with the logical unit number to a read only permission.

12. The data storage equipment of claim 11, wherein the indication comprises an instruction not to execute the command, and wherein the instruction was generated by the validation equipment to prevent the command from executing.

13. The data storage equipment of claim 11, wherein the validation check comprises comparing credentials of the process with a source of valid credentials for issuing the command.

14. The data storage equipment of claim 11, wherein the connection was established based on a multipath input output protocol.

15. A non-transitory machine-readable medium, comprising executable instructions that, when executed by a processor of a security device, facilitate performance of operations, comprising:
identifying a command communicated by a network device and a storage device equipment via a network, wherein the command was generated based on execution authority for executing the command by the storage device, wherein the network communicates the command from the network device and the storage device through a multipath input output protocol interface, and wherein the multipath input output protocol interface executes at least one of a group of protocol standards conforming to a non volatile memory express over fabric protocol standard, a non volatile memory express over transmission control protocol standard, and a small computer system interface over fiber channel protocol standard;
based on the execution authority, employing a validation process to test validity of the execution authority for the command to be executed by the storage device;
based on the validation process determining that the execution authority is invalid, blocking activity based on the command from occurring at the storage device, wherein blocking the activity based on the command from occurring at the storage device comprises preventing delivery of the command to the storage device;
in response to the blocking activity, receiving, via the multipath input output protocol interface, an updated source of approved command processes and communicating, to the network device via the multipath input output protocol interface, a logical unit number associated with storage array equipment to which the updated source of approved command processes has been persisted; and in response to determining, based on the logical unit number, that the network equipment has transferred the updated source of approved command processes, causing, via the multipath input output protocol interface, the storage array equipment to set a permission associated with the logical unit number to a read only permission.

16. The non-transitory machine-readable medium of claim 15, wherein blocking the activity based on the command further comprises controlling the storage device not to execute the command.

17. The non-transitory machine-readable medium of claim 15, wherein the command comprises a command to improperly restrict access to data stored by the storage device.

18. The non-transitory machine-readable medium of claim 15, wherein the command comprises a removal command.

19. The non-transitory machine-readable medium of claim 15, wherein the command comprises a write command.

20. The non-transitory machine-readable medium of claim 15, wherein the multipath input output protocol interface was established based on a multipath input output protocol.

* * * * *